US012567180B2

(12) United States Patent
Cho et al.

(10) Patent No.: US 12,567,180 B2
(45) Date of Patent: Mar. 3, 2026

(54) ELECTRONIC APPARATUS AND CONTROLLING METHOD FOR AUTOMATICALLY GENERATING VIRTUAL SPACE CORRESPONDING TO ITEMS OF AVATAR

(71) Applicant: SAMSUNG ELECTRONICS CO., LTD., Suwon-si (KR)

(72) Inventors: Eun-Ae Cho, Suwon-si (KR); Sangshin Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 197 days.

(21) Appl. No.: 18/204,040

(22) Filed: May 31, 2023

(65) Prior Publication Data

US 2023/0368429 A1      Nov. 16, 2023

Related U.S. Application Data

(63) Continuation of application No. PCT/KR2023/002806, filed on Feb. 28, 2023.

(30) Foreign Application Priority Data

May 11, 2022      (KR) ......................... 10-2022-0057808

(51) Int. Cl.
G06T 11/00      (2006.01)
G06N 3/08      (2023.01)
H04L 67/131      (2022.01)

(52) U.S. Cl.
CPC ................ *G06T 11/00* (2013.01); *G06N 3/08* (2013.01); *H04L 67/131* (2022.05)

(58) Field of Classification Search
CPC ......... G06T 11/00; G06T 19/006; G06N 3/08; G06N 3/094; G06N 3/0475
See application file for complete search history.

(56) References Cited

U.S. PATENT DOCUMENTS 10,325,416 B1      6/2019  Scapel et al.
11,557,093 B1 *   1/2023  Terrano .................. A63F 13/26
(Continued)

FOREIGN PATENT DOCUMENTS

JP      2020-107123 A      7/2020
JP      2023-528203 A      7/2023
(Continued)

OTHER PUBLICATIONS

International Search Report (PCT/ISA/210) issued by the International Searching Authority on Jun. 15, 2023 in corresponding International Application No. PCT/KR2023/002806.
(Continued)

*Primary Examiner* — Jin Cheng Wang
(74) *Attorney, Agent, or Firm* — Sughrue Mion, PLLC

(57)      ABSTRACT

A method of an electronic apparatus, includes: receiving, from a first user terminal, first avatar information corresponding to a first user and receive, from a second user terminal, second avatar information corresponding to a second user; identifying at least one first information of the first avatar information and at least one second information included in the second avatar information; identifying a first item based on the identified first information of the first avatar information; identifying a second item based on the identified second information of the second avatar information; obtaining a virtual space image in a metaverse by inputting the feature information corresponding to the identified first item and the identified second item to a trained neural network model; and transmitting the obtained virtual space image to the first user terminal and the second user terminal.

13 Claims, 15 Drawing Sheets

(56)         References Cited

U.S. PATENT DOCUMENTS

| | | | |
|---|---|---|---|
| 2020/0142475 | A1 | 5/2020 | Paez et al. |
| 2021/0248803 | A1* | 8/2021 | Kojima ................... G06T 19/00 |
| 2022/0124140 | A1* | 4/2022 | Okina .................... G06V 40/20 |
| 2022/0124286 | A1* | 4/2022 | Punwani ............ H04L 65/1069 |
| 2022/0156986 | A1 | 5/2022 | Liang |
| 2023/0092494 | A1* | 3/2023 | Shirai ..................... A63F 13/30 |
| | | | 345/419 |
| 2023/0201716 | A1* | 6/2023 | Hayata ................... A63F 13/79 |
| | | | 463/31 |
| 2023/0232177 | A1* | 7/2023 | Mindlin ................. G06F 3/167 |
| | | | 709/204 |
| 2023/0283522 | A1* | 9/2023 | Hesse, II ........... H04L 43/0876 |
| | | | 709/223 |
| 2023/0344829 | A1* | 10/2023 | Patel ................. H04L 63/0861 |
| 2023/0367444 | A1* | 11/2023 | Yerli ...................... G06T 13/20 |
| 2024/0165514 | A1* | 5/2024 | Kitano ................... G06F 3/016 |
| 2024/0361828 | A1* | 10/2024 | Norieda ................. G06F 3/012 |
| 2024/0362871 | A1* | 10/2024 | Norieda ................. G06T 19/20 |
| 2024/0370079 | A1* | 11/2024 | Mine ...................... A63F 13/75 |

FOREIGN PATENT DOCUMENTS

| | | | |
|---|---|---|---|
| KR | 10-1512215 | B1 | 4/2015 |
| KR | 10-2015-0097903 | A | 8/2015 |
| KR | 10-1839122 | B1 | 3/2018 |
| KR | 10-1872000 | B1 | 6/2018 |
| KR | 10-2021-0148591 | A | 12/2021 |
| KR | 10-2022-0027187 | A | 3/2022 |
| KR | 10-2376390 | B1 | 3/2022 |
| KR | 10-2023-0057851 | A | 5/2023 |
| KR | 10-2023-0111582 | A | 7/2023 |
| KR | 10-2023-0127808 | A | 9/2023 |

OTHER PUBLICATIONS

Written Opinion (PCT/ISA/237) issued by the International Searching Authority on Jun. 15, 2023 in corresponding International Application No. PCT/KR2023/002806.

* cited by examiner

| INDEX | ITEM |
|-------|------|
| 0001 | |
| 0002 | |
| ⋮ | |
| 0101 | |
| 0102 | |
| ⋮ | |
| 0201 | |
| 0202 | |
| ⋮ | |

FIG. 3B

FIG. 3D
360
370
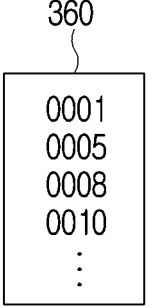
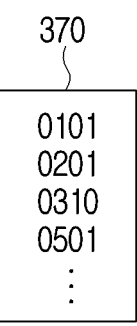

FIG. 6

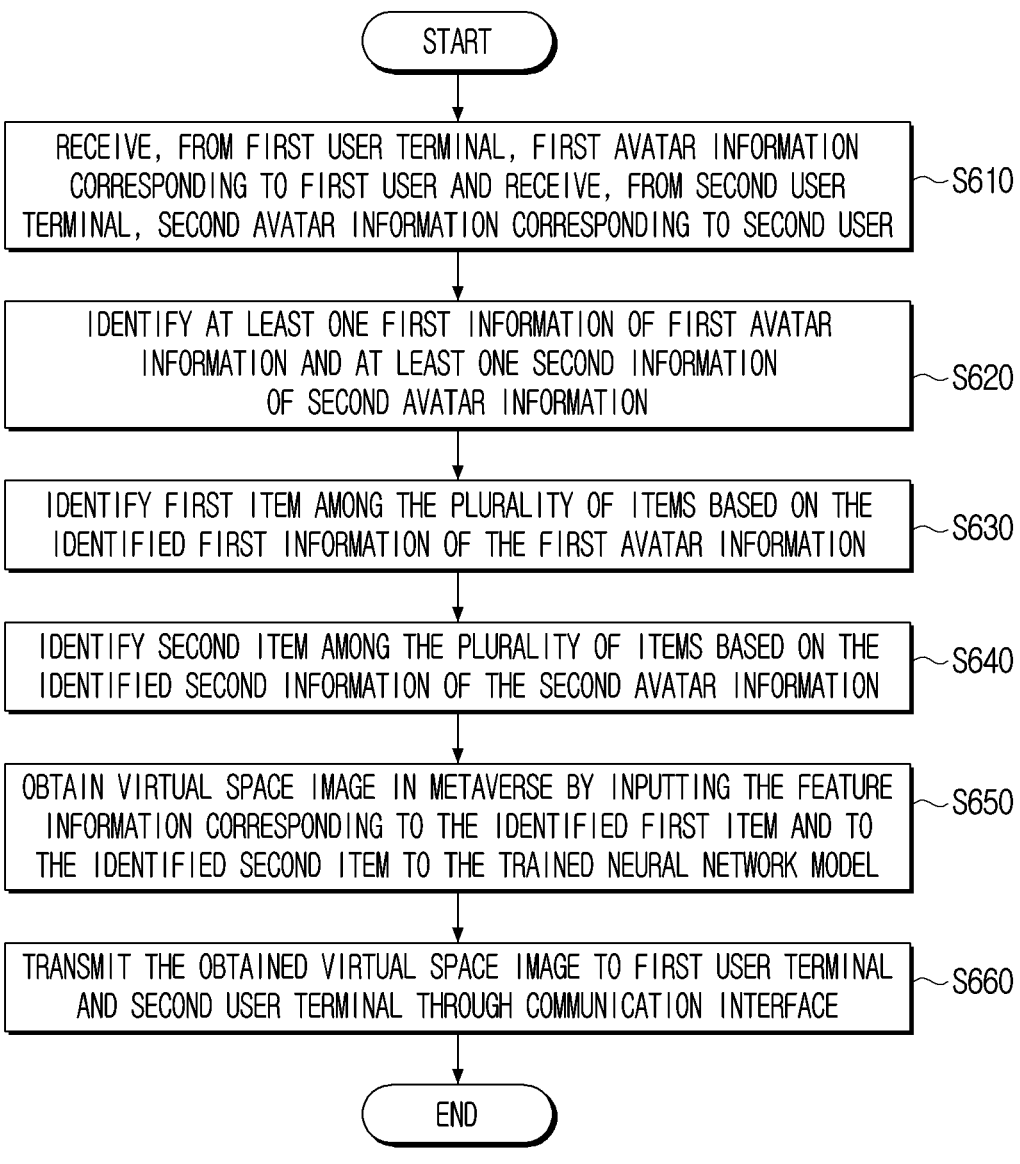

START

↓

RECEIVE, FROM FIRST USER TERMINAL, FIRST AVATAR INFORMATION CORRESPONDING TO FIRST USER AND RECEIVE, FROM SECOND USER TERMINAL, SECOND AVATAR INFORMATION CORRESPONDING TO SECOND USER ~S610

↓

IDENTIFY AT LEAST ONE FIRST INFORMATION OF FIRST AVATAR INFORMATION AND AT LEAST ONE SECOND INFORMATION OF SECOND AVATAR INFORMATION ~S620

↓

IDENTIFY FIRST ITEM AMONG THE PLURALITY OF ITEMS BASED ON THE IDENTIFIED FIRST INFORMATION OF THE FIRST AVATAR INFORMATION ~S630

↓

IDENTIFY SECOND ITEM AMONG THE PLURALITY OF ITEMS BASED ON THE IDENTIFIED SECOND INFORMATION OF THE SECOND AVATAR INFORMATION ~S640

↓

OBTAIN VIRTUAL SPACE IMAGE IN METAVERSE BY INPUTTING THE FEATURE INFORMATION CORRESPONDING TO THE IDENTIFIED FIRST ITEM AND TO THE IDENTIFIED SECOND ITEM TO THE TRAINED NEURAL NETWORK MODEL ~S650

↓

TRANSMIT THE OBTAINED VIRTUAL SPACE IMAGE TO FIRST USER TERMINAL AND SECOND USER TERMINAL THROUGH COMMUNICATION INTERFACE ~S660

↓

END

ELECTRONIC APPARATUS AND CONTROLLING METHOD FOR AUTOMATICALLY GENERATING VIRTUAL SPACE CORRESPONDING TO ITEMS OF AVATAR

CROSS-REFERENCE TO RELATED APPLICATIONS

This application is a by-pass continuation application of International Application No. PCT/KR2023/002806, filed on Feb. 28, 2023, which based on and claims priority to Korean Patent Application No. 10-2022-0057808, filed on May 11, 2022, in the Korean Intellectual Property Office, the disclosures of which are incorporated by reference herein in their entireties.

BACKGROUND

1. Field

This disclosure relates to an electronic apparatus and a controlling method thereof, and more particularly, to an electronic apparatus that creates a virtual space image and a controlling method thereof.

2. Description of Related Art

With the development of electronic technology, an electronic apparatus, in particular, a server-based real-time rendering service has been widely used. In particular, a virtual world may be built through an electronic apparatus such as a server, and a plurality of users may communicate in the virtual world. The virtual world is also called a metaverse, a virtual world, or a digital world, and refers to a three-dimensional virtual world in which social, economic, and cultural activities are performed as in the real world.

In order to use a virtual world built through an electronic apparatus, an user may need to create an avatar in which the user's image is projected through a user's terminal such as a TV, a smartphone, a tablet Personal Computer (PC), etc., and the user may perform social, economic and cultural activities in the virtual world through the avatar.

However, the technology in the related art has a problem in that in order to create a virtual space which is the background of the virtual world, a user must directly select one of the previously created virtual space themes, or when the user wants a new virtual space other than the previously created virtual spaces, an engineer/programmer/designer must create a new virtual space to meet the user's request.

SUMMARY

According to an aspect of the disclosure, an electronic apparatus includes: a communication interface; a memory configured to store (i) feature information corresponding to a plurality of items corresponding to an avatar and (ii) a trained neural network model; and a processor is associated with the communication interface and the memory. The processor is configured to: receive, from a first user terminal, first avatar information corresponding to a first user and receive, from a second user terminal, second avatar information corresponding to a second user; identify at least one first information of the first avatar information and at least one second information of the second avatar information; identify a first item among the plurality of items based on the identified first information of the first avatar information;

identify a second item among the plurality of items based on the identified second information of the second avatar information; obtain a virtual space image in a metaverse by inputting the feature information corresponding to the identified first item and to the identified second item to the trained neural network model; and transmit the obtained virtual space image to the first user terminal and the second user terminal through the communication interface.

According to another aspect of the disclosure, a method of an electronic apparatus, includes: receiving, from a first user terminal, first avatar information corresponding to a first user and receive, from a second user terminal, second avatar information corresponding to a second user; identifying at least one first information of the first avatar information and at least one second information included in the second avatar information; identifying a first item among the plurality of items based on the identified first information of the first avatar information; identifying a second item among the plurality of items based on the identified second information of the second avatar information; obtaining a virtual space image in a metaverse by inputting the feature information corresponding to the identified first item and the identified second item to a trained neural network model; and transmitting the obtained virtual space image to the first user terminal and the second user terminal.

According to another aspect of the disclosure, a computer readable recording medium in which a computer instruction is executed by a processor of an electronic apparatus so that the electronic apparatus performs an operation. The operation includes: receiving, from a first user terminal, first avatar information corresponding to a first user and receive, from a second user terminal, second avatar information corresponding to a second user; identifying at least one first information of the first avatar information and at least one second information included in the second avatar information; identifying a first item among the plurality of items based on the identified first information of the first avatar information; identifying a second item among the plurality of items based on the identified second information of the second avatar information; obtaining a virtual space image in a metaverse by inputting the feature information corresponding to the identified first item and the identified second item to a trained neural network model; and transmitting the obtained virtual space image to the first user terminal and the second user terminal.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 3A to 3D are views provided to explain a feature information identification method according to an embodiment;

FIG. 6 is a flowchart provided to explain a controlling method of an electronic apparatus according to an embodiment;

FIG. 10 is a view provided to explain detailed configuration of an electronic apparatus according to an embodiment.

DETAILED DESCRIPTION

Hereinafter, the present disclosure will be described with reference to the accompanying drawings. The terms used in the example embodiments of the disclosure are general terms which are widely used now and selected considering the functions of the disclosure.

However, the terms may vary depending on the intention of a person skilled in the art, a precedent, or the advent of new technology. In addition, in a specified case, the term may be arbitrarily selected. In this case, the meaning of the term will be explained in the corresponding description. Therefore, terms used in the disclosure may be defined based on a meaning of the terms and contents described in the disclosure, not simply based on names of the terms.

As used herein, the expression "have", "may have", "include", or "may include" refers to the existence of a corresponding feature (e.g., numeral, function, operation, or constituent element such as component), and does not exclude one or more additional features.

The expression of "at least one of A and/or B" is to be understood as indicating any one of "A" or "B" or "A and B." The expression "a first", "a second", "the first", or "the second" used in various example embodiments of the disclosure may modify various components regardless of their order and/or the importance but does not limit the corresponding components.

A singular expression includes a plural expression as long as they are clearly distinguished in the context. In the application, it should be understood that the terms such as "comprising", "including" are intended to express that features, numbers, steps, operations, constituent elements, part, or combinations thereof described in the specification are present and do not exclude existence or additions of one or more other features, numbers, steps, operations, constituent elements, part, or combinations thereof.

In this disclosure, the term "user" may indicate a person who uses an electronic apparatus or a device (e.g., an artificial intelligence electronic device) that uses an electronic apparatus. Hereinafter, one or more embodiments of the present disclosure will be described in greater detail.

Figure 1:
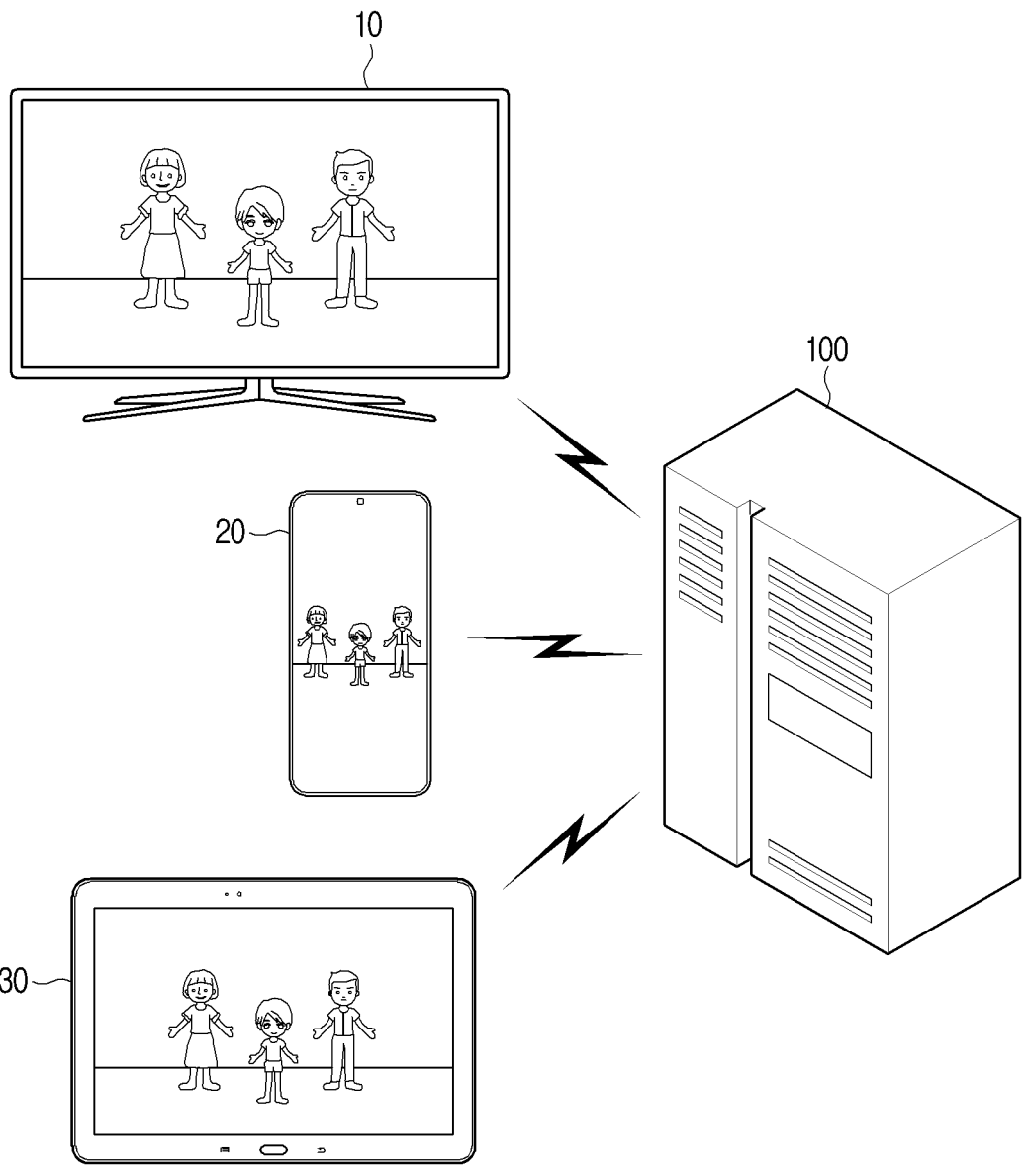
FIG. 1 is a view provided to explain an operation method of an electronic apparatus according to an embodiment.

FIG. 1 is a view provided to explain an operation method of an electronic apparatus according to an embodiment. Here, the electronic apparatus 100 may be a server according to an embodiment. Here, the server may be implemented as various types of servers such as a cloud server, an embedded server, etc.

The electronic apparatus 100 may receive information regarding an avatar corresponding to each of a plurality of user terminals 10, 20, 30 and create a virtual world image based thereon. Here, the virtual world image may include not only a user's avatar but also a background image in a virtual world, which is an image regarding a virtual space. The electronic apparatus 100 may transmit the created virtual world image to the plurality of user terminals 10, 20, 30.

The user terminals 10, 20, 30 provide a metaverse service and may include at least one of a TV, a smartphone, a tablet PC, a desktop PC, or a notebook PC. However, the user terminals 10, 20, 30 are not limited thereto. According to an embodiment, a virtual world image may be provided through a display provided on the user terminals 10, 20, 30, and a metaverse service may be provided. According to another embodiment, a virtual world image displayed through a display provided on the user terminals 10, 20, 30 may be provided through a wearable device, such as a headset, glasses, and a helmet, etc.

According to an embodiment, the user terminals 10, 20, 30 may include a camera, obtain motion information of a user based on an image captured through the camera, transmit the obtained information to the electronic apparatus 100, and display a virtual world image including a user avatar received from the electronic apparatus 100 through a display.

When a user's input is required to create a background image (that is, an image regarding a virtual space), it may be cumbersome in many ways. One or more embodiments of creating a virtual space image automatically based on avatar information corresponding to each of a plurality of users without a separate user's input will be described.

Figure 2:
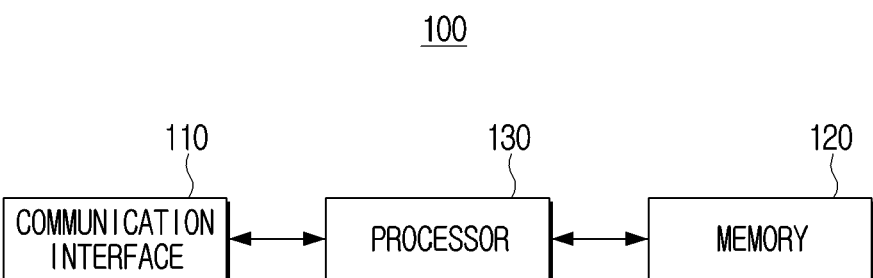
FIG. 2 is a block diagram provided to explain configuration of an electronic apparatus according to an embodiment.

FIG. 2 is a block diagram provided to explain configuration of an electronic apparatus according to an embodiment. In FIG. 2, the electronic apparatus 100 may include a communication interface 110, a memory 120, and a processor 130.

The communication interface 110 is configured to perform communication with various types of external devices according to various types of communication methods. For example, the electronic apparatus 100 may perform communication with a user terminal 10 through the communication interface 110.

The communication interface 110 may include a Wi-Fi module, a Bluetooth module, an infrared communication module, a wireless communication module, etc. Here, each communication module may be implemented in a form of at least one hardware chip.

The Wi-Fi module and the Bluetooth module perform communication in a WiFi method and in a Bluetooth method, respectively. When the Wi-Fi module or the Bluetooth module is used, various connection information such as a Service Set Identifier (SSID) and a session key may be transmitted and received, communication may be established using the various connection information, and thereafter, various types of information may be transmitted or received. The infrared communication module performs communication according to Infrared Data Association (IrDA) for wirelessly transmitting data within a short distance using infrared rays between visual rays and millimeter waves.

The wireless communication module may include at least one communication chip for performing communication according to various wireless communication standards, such as ZigBee, 3rd Generation (3G), 3rd Generation Partnership Project (3GPP), Long Term Evolution (LTE), LTE Advanced (LTE-A), 4th Generation (4G), and 5th Generation (5G), in addition to the communication methods described above.

The memory 120 may store data necessary for one or more embodiments of the present disclosure. The memory 120 may be implemented as a memory embedded in the electronic apparatus 100, or implemented in a memory form capable of communicating with (or being detachable from) the electronic apparatus 100, based on a data storage purpose. For example, data for driving the electronic apparatus 100 may be stored in the memory embedded in the electronic apparatus 100, and data for an extension function of the electronic apparatus 100 may be stored in the memory capable of communicating with the electronic apparatus 100.

When implemented as the memory embedded in the electronic apparatus 100, the memory 120 may be implemented as at least one of a volatile memory (e.g., Dynamic Random Access Memory (DRAM), Static RAM (SRAM), or Synchronous Dynamic RAM (SDRAM)), or a non-volatile memory (e.g., One-Time Programmable Read Only Memory (OTPROM), Programmable ROM (PROM), Erasable And Programmable ROM (EPROM), Electrically Erasable And Programmable ROM (EEPROM), mask ROM, flash ROM, flash memory (e.g., NAND flash, or NOR flash), hard drive, or Solid State Drive (SSD)). When implemented as the memory capable of communicating with the electronic apparatus 100, the memory 120 may be implemented in the form of a memory card (e.g., Compact Flash (CF), Secure Digital (SD), Micro Secure Digital (Micro-SD), Mini Secure Digital (Mini-SD), eXtreme Digital (xD), or Multi-Media Card (MMC)), or an external memory (e.g., Universal Serial Bus (USB) memory) which may be connected to a USB port.

According to an embodiment, the memory 120 may store information related to a plurality of items constituting (corresponding to) an avatar. For example, the memory 120 may store index information or image information corresponding to each item worn by the avatar. The memory 120 may store a trained neural network model, and at least one virtual space image obtained from the trained neural network model. In addition, the memory 120 may store at least one virtual space sample image.

The processor 130 controls overall operations of the electronic apparatus 100. Specifically, the processor 130 may be connected to each component of the electronic apparatus 100 and control the overall operations of the electronic apparatus 100. For example, the processor 130 may be connected to a component such as the communication interface 110, the memory 120, etc., and control the operations of the electronic apparatus 100.

According to an embodiment, the processor 130 may be implemented as a Digital Signal Processor (DSP), a micro-processor, or a Time Controller (TCON). However, the processor 130 is not limited thereto, and may include one or more of a Central Processing Unit (CPU), a Micro Controller Unit (MCU), a Micro Processing Unit (MPU), a controller, an Application Processor (AP), a Communication Processor (CP), or an ARM processor, or may be defined by these terms. In addition, the processor 130 may be implemented by a System-On-Chip (SoC) or a Large Scale Integration (LSI) in which a processing algorithm is embedded, or may be implemented in the form of a Field Programmable Gate Array (FPGA).

In addition, according to an embodiment, the processor 130 for executing an artificial intelligence model (or a neural network model) may be implemented through a combination of a processor and software, the processor including a general-purpose processor such as the CPU, the AP or the DSP, a graphics-only processor such as a Graphic Processing Unit (GPU) or a Vision Processing Unit (VPU), or an Artificial Intelligence (AI)-only processor such as Neural Processing Unit (NPU). The processor 130 may perform control to process input data based on a predefined operation rule or the neural network model, stored in the memory 120.

Alternatively, when the processor 130 is a dedicated processor (or a processor dedicated for AI), the processor 130 may be designed to have a hardware structure specialized for processing a specific AI model. For example, hardware specialized for processing a specific AI model may be designed as a hardware chip such as an Application Specific Integrated Circuit (ASIC) or the FPGA. When the processor 130 is implemented as a dedicated processor, the processor 130 may be implemented to include a memory for implementing the embodiments of the present disclosure, or may be implemented to include a memory processing function for using an external memory.

Firstly, according to an embodiment, the processor 130 may receive avatar information corresponding to each of a plurality of users from a plurality of user terminals through the communication interface 110. According to an embodiment, the avatar information may include at least one of image information of an avatar corresponding to a user or information corresponding to each item of the avatar image (e.g., index information, identification information).

An avatar may be created according to the user's selection of an avatar item (or a user's input), or may be automatically created based on an image of the user. For example, an avatar may be automatically created based on the user's face, hairstyle, clothes, etc. The avatar item may include various types of items such as a clothing item, an accessory item, a skin item, a hair item, a face item, or so. Alternatively, one item may include a plurality of detailed items. For example, the face item may include detailed items such as face shape, eye shape, nose shape, mouth shape, hairstyle, hair color, top style, bottom style, shoes, etc.

According to an embodiment, when an avatar having a shape (e.g., including a slim face, long straight hair, and a skirt) is selected in a user terminal according to a user's input, information regarding the corresponding avatar may be received from the user terminal through the communication interface 110.

According to an embodiment, when an avatar image is received as avatar information, the processor 130 may separate a plurality of items of the avatar image and obtain (i) an image regarding each of the plurality of items or (ii) index information corresponding to each of the plurality of items.

According to another embodiment, the processor 130 may receive index information corresponding to each of a plurality of items. In this case, the index information may be represented as various types of information in order to identify each avatar item. For example, the index information may be represented as a combination of at least one of various numbers such as decimal numbers, binary numbers, and characters, but is not limited thereto.

According to an embodiment, the index information may be represented as a first type index in which an item type is not identified. According to another embodiment, the index information may be represented as a second type index in which an item type is identified.

For example, the index may be represented as the first type index such as 0001, 0002, 0003, 0004 . . . , or may be represented as the second type index such as 0101, 0102, . . . , 0201, 0201, . . . (here, the first two digits indicate an item type). According to an embodiment, in a case where a user avatar having a slim face item 0001, a long straight hair item 008 and a training suit item 0034 is created in a user terminal, corresponding index information 0001, 0008, 0034 may be received. However, as described above, an avatar image itself may be received.

Subsequently, according to an embodiment, when an avatar image is received from a user terminal, the processor 130 may identify at least one item of the avatar image. According to an embodiment, the processor 130 may identify each item in the avatar image based on image information corresponding to each item stored in the memory 120.

According to another embodiment, the processor 130 may identify each item of the avatar image by inputting the avatar image to a trained neural network model. The above-described neural network model may be a neural network model separate from a neural network model that obtains a virtual space image, which will be described later. For example, a deep learning method (such as an object detection that detects an object in an input image) may be used in a neural network model for identifying an item.

Learning of the neural network model for identifying an item may be performed through the electronic apparatus 100, but is not limited thereto and may be performed through a separate server and/or system. The examples of learning algorithms include supervised learning, unsupervised learning, semi-supervised learning, or reinforcement learning.

According to another embodiment, when index information corresponding to each item of an avatar image is received from a user terminal, the processor 130 may identify each item of the avatar image based on the received index information. For example, when index information corresponding to a hair band is "0101," the processor 130 may identify that the hair band is included in the avatar image, based on the received "0101." However, when a neural network model (to be described later) uses index information as input data, it is possible to omit the process of identifying an item based on the index information.

Subsequently, according to an embodiment, the processor 130 may identify an item corresponding to a plurality of items stored in the memory 120 from among the identified at least one item, which will be described in detail with reference to FIGS. 3A to 3D below.

FIGS. 3A to 3D are views provided to explain a feature information identification method according to an embodiment. The memory 120 may store feature information corresponding to a plurality of items constituting (corresponding to) an avatar. Here, the feature information may be at least one of an item image, an item index, or information in which an item image and an item index are matched. Hereinafter, an embodiment for feature information that is implemented as information in which an item image and an item index are matched will be described.

According to an embodiment, items constituting (corresponding to) an avatar may include various types of items such as a clothing item, an accessory item, a skin item, a hair item, and a face item. According to FIGS. 3A and 3B, the memory 120 may store an item image and an index corresponding thereto.

Figure 3A:
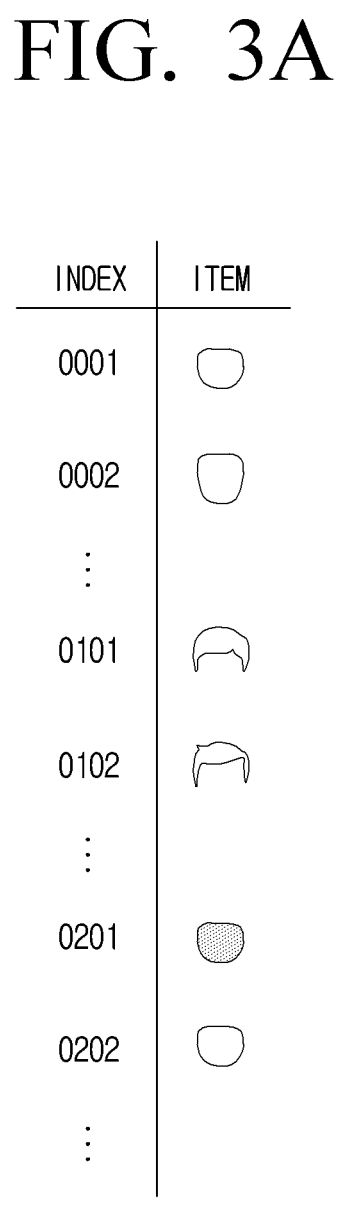

However, as illustrated in FIG. 3A, an index corresponding to an item may be related to the type of the item. For example, the first two digits among the four digits may indicate the item type. For example, a face item may start with index "00", a hair item with "01", and a skin item with "02."

The processor 130 may identify an item of a specific type based on an index value. For example, in order to identify only items other than a face shape type item and a skin color type item, the processor 130 may identify indexes other than indexes starting with "00" and "02." This is to identify a specific type of item that has little relevance to virtual space image creation.

Figure 3B:
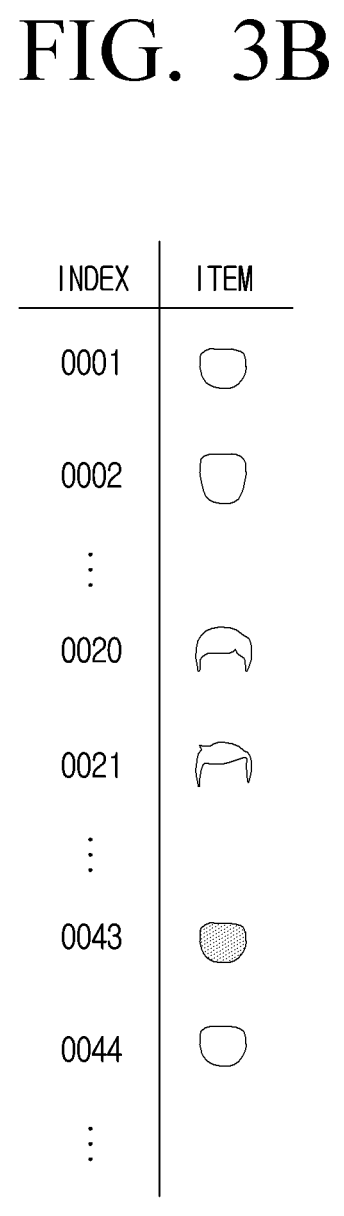
Figure 3C:
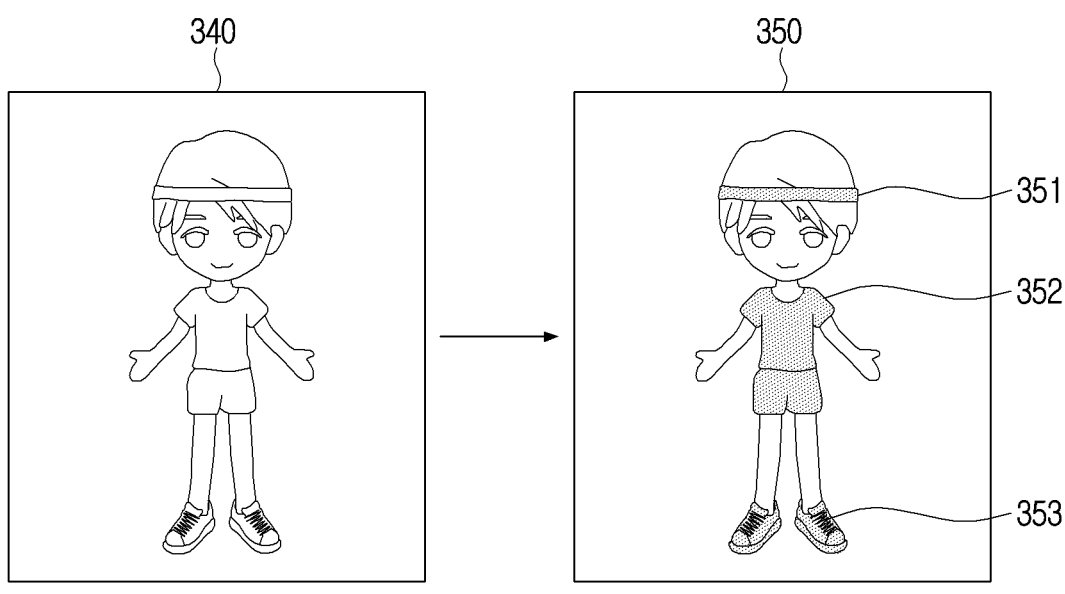

As illustrated in FIG. 3B, index information corresponding to an item may not be related to the type of the item. In FIG. 3C, the processor 130 may identify an item from an image corresponding to an avatar. According to an embodiment, when an avatar image 340 is obtained, the processor 130 may input the avatar image 340 to a trained neural network model and identify a hair band 351, a training suit 352, and sneakers 353 of the avatar image. In this case, a deep learning method (such as object detection for detecting an object in an image) may be used.

However, the present disclosure is not limited thereto, and according to another embodiment, image information corresponding to each of the hair band, training suit and sneakers stored in the memory 120 may be obtained, and the corresponding image information may be identified in the received avatar image.

In FIG. 3D, according to an embodiment, when index information is received as avatar information, the processor 130 may identify feature information corresponding to an identified item based on feature information corresponding to each of a plurality of items stored in the memory 120.

According to an embodiment, when avatar information including index information is received, the processor 130 may identify index information corresponding to each item stored in the memory 120 from among index information of the avatar information, and identify the identified index information as feature information. In other words, when avatar information is index information, the processor 130 may obtain feature information of an item based on the avatar information without going through an item identification process separately.

As shown above, the reason for identifying an item based on item information stored in the memory 120 may be to exclude unlearned item information. However, it may not be necessary to identify item information stored in the memory 120 when the neural network model has learned all items of an avatar received from a user terminal.

Subsequently, returning back to FIG. 2, according to an embodiment, when feature information corresponding to an item stored in the memory 120 is identified, the processor 130 may obtain a virtual space image in a metaverse by inputting the identified feature information corresponding to the item to the trained neural network model, and transmit the obtained virtual space image to a user terminal through the communication interface 110.

Here, according to an embodiment, the feature information corresponding to an item may include at least one of an image corresponding to each item or index information corresponding to each item. For example, when a hair band, a training suit, and sneakers are identified as items corresponding to items stored in the memory 120, images corresponding to each of the hair band, training suit and sneakers may be feature information as illustrated in FIG. 3A.

As another example, the feature information may be index information corresponding to each of the hair band, training suit and sneakers. In other words, a virtual space image in a metaverse may be obtained by inputting only index information to the trained neural network model. Accordingly, even when the user deletes the avatar information (e.g., the clothes worn by the avatar, etc.), and thus, it may be impossible to obtain the feature information of the avatar through the image information of the avatar, a virtual space image can be obtained with only the index information. The present disclosure is not limited thereto, and both an image corresponding to each item and index information may be included. In other words, the type of feature information may be determined based on learning data of the neural network model.

Here, the trained neural network model may be a Generative Adversarial Network (GAN) according to an embodiment. GAN trains a method of generating false data that is the closest to the truth by competitively training a network (Generator, G) that generates false data closest to the truth and a network (Discriminator, D) that discriminates false data. According to an embodiment, when a plurality of pieces of item information constituting (corresponding to) an avatar are input, the neural network model may be trained to create and output a virtual space image related to the plurality of pieces of item information.

Here, a learning of the neural network model may be performed through the electronic apparatus 100, but is not limited thereto. The leaning of the neural network model may be performed through a separate server and/or system. Examples of learning algorithms are supervised learning, unsupervised learning, semi-supervised learning, and reinforcement learning.

In this case, the neural network model may be trained to create a virtual space image based on a specific type of item information. For example, the neural network model may be trained by using a hair band, a training suit and sneakers as input data and a virtual space image corresponding to a fitness club as output data.

However, the present disclosure is not limited thereto. An image corresponding to an item and an avatar image of the item may be input, and the neural network model may be trained as index information corresponding to the item is input. In other words, the neural network model may be trained based on at least one of text information or image information.

The neural network model may be trained based on a corresponding virtual space image as well as the text information and the image information. Here, the virtual space image used as learning data may include at least one of a sample virtual space image pre-stored in the memory 120 or a virtual space image pre-obtained from the neural network model.

The virtual space image may be an image corresponding to a virtual space that matches the input feature information of an avatar, and there may be a plurality of virtual space images output through the neural network model. For example, the processor 130 may obtain a virtual image corresponding to a plurality of fitness clubs in which there are differences in types of objects, arrangement structures, and interiors of objects existing in a virtual space through a neural network model.

According to an embodiment, the processor 130 may obtain a plurality of virtual space images through the trained neural network model and a probability value corresponding to the accuracy of each of the plurality of virtual space images, and the processor 130 may identify one of the plurality of virtual space images based on the obtained probability value corresponding to the accuracy of each of the plurality of virtual space images. For example, the processor 130 may identify a virtual space image having the highest probability value from among obtained probability values corresponding to each of the plurality of virtual space images, and transmit the same to a user terminal.

According to an embodiment, the processor 130 may input all feature information of an identified item to a neural network model, or may input only feature information of a specific time from among feature information of the identified item to a neural network model. According to an embodiment, the processor 130 may obtain a virtual space image by inputting feature information of a virtual space together with feature information of the identified item to the trained neural network model.

Here, the feature information of the virtual space means information regarding a feature corresponding to the virtual space image to be created and may be, for example, at least one of information regarding a type, an atmosphere, a style of a place, or a time zone in the virtual space.

According to an embodiment, the processor 130 may receive a user's input corresponding to information regarding the type, the atmosphere, the style of a place, or the time zone of a virtual space from a user terminal through the communication interface 110, and obtain a virtual space image by inputting the received information to the trained neural network model. For example, when a user's input corresponding to "fitness club", "bright atmosphere", "neat style", and "daytime" is received, the processor 130 may obtain a virtual space image by inputting the same to the trained neural network model together with feature information corresponding to the identified item.

Figure 4A:
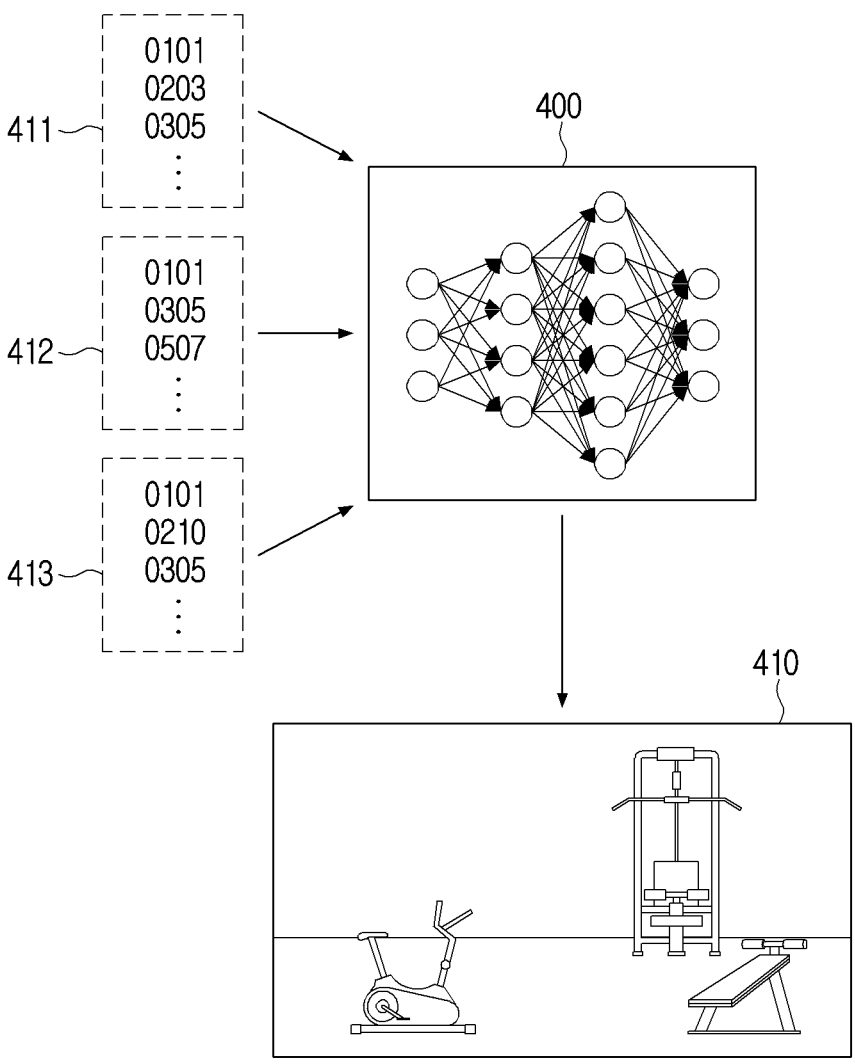
FIGS. 4A to 4C are views provided to explain a method of obtaining a virtual space image through a neural network model according to an embodiment.
Figure 4B:
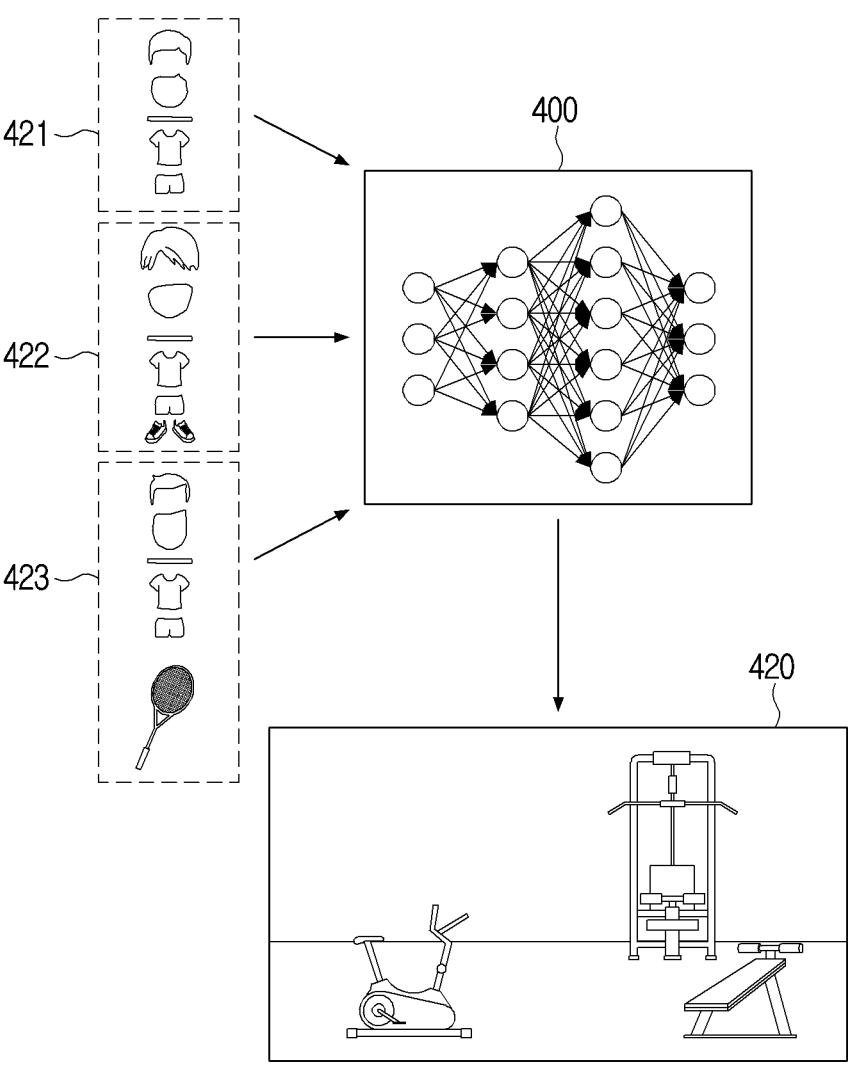
Figure 4C:
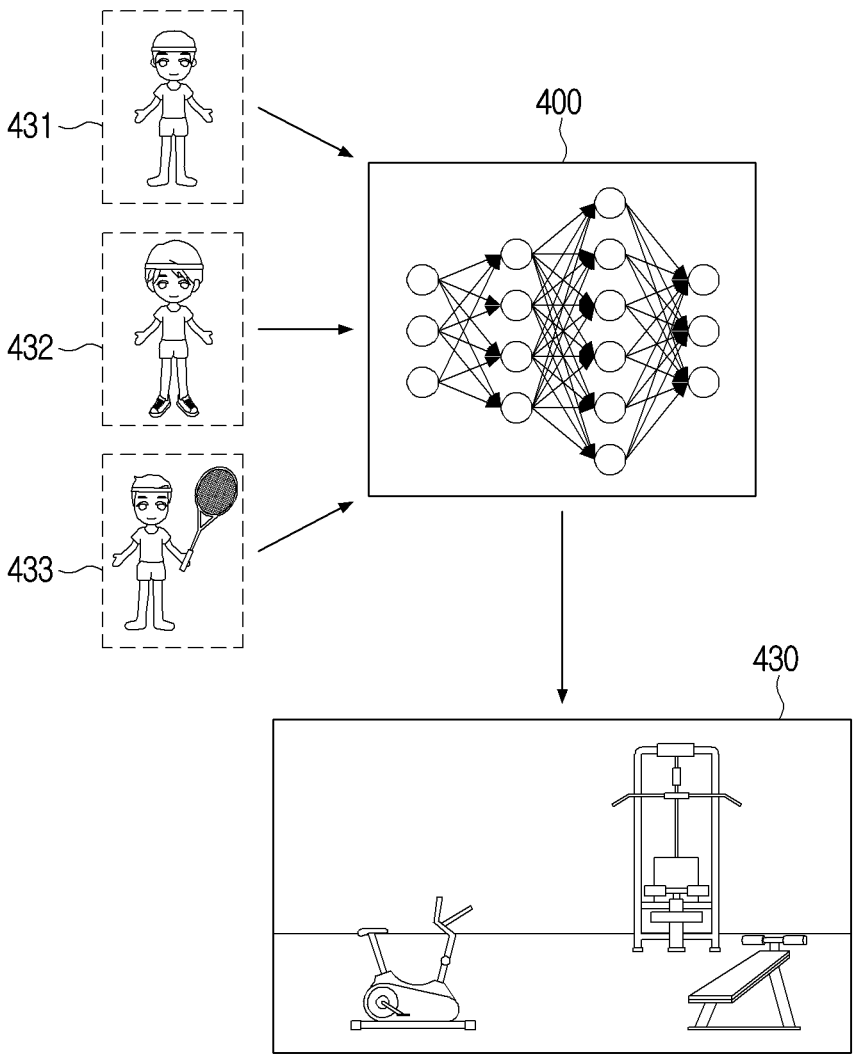

FIGS. 4A to 4C are views provided to explain an operation of obtaining a virtual space image through a neural network model according to an embodiment. In FIG. 4A, according to an embodiment, when an item corresponding to an item stored in the memory 120 is identified, the processor 130 may input index information 411, 412, 413 to a trained neural network model 400 as feature information corresponding to the identified item.

According to an embodiment, when the items identified based on first avatar information corresponding to a first user are a hair band (index 1010), a windbreaker (index 0203) and sneakers (index 0305), the identified index information (0101, 0203, 0305) may be input to the neural network model 400. In addition, second items identified based on second avatar information corresponding to a second user are the hair band (index 0101), the sneakers (index 0305) and a skipping rope (index 0507), the identified index information (0101, 0305, 0507) may be input to the neural network model 400. Likewise, when third items identified based on third avatar information corresponding to a third user are the hair band (index 0101), a jacket (index 0210) and the sneakers (index 0305), the identified index information (0101, 0210, 0305) may be input to the neural network model 400.

Subsequently, the processor 130 may obtain a virtual space image 410 by inputting identified index information 411, 412, 413) to the neural network model 400, and transmit the obtained virtual space image to a user terminal through the communication interface 110.

In the case of the above-described example, as the items input to the trained neural network model are the hair band, the sneakers, and the training suit which are related to a fitness clue, the output virtual space image may be a virtual space image corresponding to a fitness club. In this case, the virtual space image may be a Three-Dimensional (3D) image.

In FIG. 4B, when an item corresponding to an item stored in the memory 120 is identified, the processor 130 according to an embodiment may first input an image (421 to 423) corresponding to the item to the trained neural network model 400 as feature information corresponding to the identified item. For example, the processor 130 may obtain a virtual space image 420 corresponding to a fitness club by inputting an image of a first item of a first avatar (an image correspond to a hairstyle, a face shape, a hair band and a training suit, respectively), an image of a second item of a second avatar (an image corresponding to a hairstyle, a face shape, a hair band, a training suit, and sneakers, respectively), and an image of a third item of a third avatar (an image corresponding to a hairstyle, a face shape, a hair band, a training suit, and a tennis racket, respectively) to the trained neural network model 400, and transmit the obtained virtual space image to a user terminal through the communication interface 110.

In FIG. 4C, the processor 130 according to an embodiment may input an image (431 to 433) corresponding to each avatar to the trained neural network model 400. In other words, the neural network model of the present disclosure may obtain a virtual space image by inputting not only an image corresponding to index information (or an item) but also an image corresponding to an avatar to the trained neural network model 400.

According to an embodiment, the first image 431 corresponding to the first avatar includes the first item image of FIG. 4B, the second image 432 corresponding to the second avatar includes the second item image 422 of FIG. 4B, and the third image 433 corresponding to the third avatar includes the third item image 423 of FIG. 4B. The processor 130 may obtain a virtual space image 430 corresponding to a fitness space by inputting the first image 431 corresponding to the first avatar, the second image 432 corresponding to the second avatar and the third image 433 corresponding to the third avatar to the trained neural network model 400, and transmit the obtained virtual space image to a user terminal through the communication interface 110.

According to another embodiment, when a plurality of items constituting (corresponding to) an avatar are input, the neural network model may be trained to create and output a virtual space image related to items of a specific type from among the plurality of items. For example, when feature information corresponding to items of a skin type, an accessory type, a clothing type, a hair type, and a face shape type is input, the neural network model may be trained to create and output a virtual space image based only on feature information corresponding to items of an accessory type and a clothing type from among a plurality of types of items.

Alternatively, according to an embodiment, the processor 130 may identify only feature information corresponding to a specific type of items from among identified feature information and input the same to the trained neural network model.

Returning back to FIG. 2, when the obtained virtual space image is transmitted to a user terminal, and then, a negative feedback regarding the virtual space image is received, the processor 130 according to an embodiment may obtain a virtual space image different from the pre-transmitted virtual space image and transmit it to a user terminal through the communication interface 110.

According to an embodiment, the processor 130 may re-obtain a virtual space image by re-inputting feature information regarding a pre-identified item to the trained neural network model, and transmit the feature information to a user terminal through the communication interface 110. According to another embodiment, the processor 130 may obtain a plurality of virtual space images and transmit a virtual space image different from a pre-submitted virtual space image from among the plurality of virtual space images to a user terminal through the communication interface 110. According to yet another embodiment, the processor 130 may transmit one of a plurality of virtual space sample images to a user terminal through the communication interface 110, which will be described in detail through FIG. 7.

Figure 5:
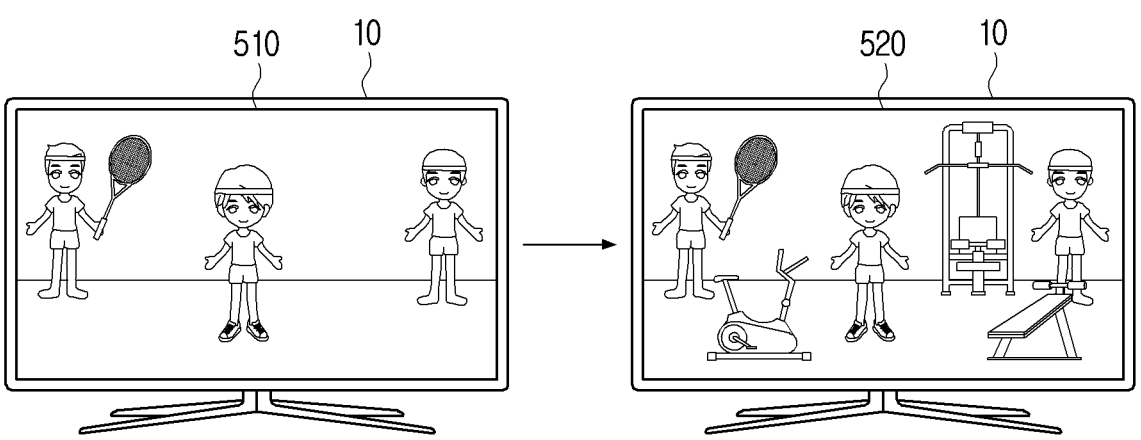
FIG. 5 is a view provided to explain a method of providing a user with a virtual space image according to an embodiment.

According to the above-described embodiment, when a virtual space image obtained in the electronic apparatus 100 is transmitted to the user terminal 10 in a state 510 where a plurality of users enters a virtual world and a virtual space is not obtained, the user terminal may provide the users with an image 520 corresponding to a virtual world including the obtained virtual space image, as illustrated in FIG. 5.

In other words, the users may obtain a virtual space image that matches a theme of the virtual world without having to select a virtual space image (or a virtual space theme), separately.

FIG. 6 is a flowchart provided to explain a controlling method of an electronic apparatus according to an embodiment. According to an operation procedure of an electronic apparatus illustrated in FIG. 6, in operation S610, the electronic apparatus (or its processor) receives, from a first user terminal, first avatar information corresponding to a first user. Also, the electronic apparatus (or its processor) receives, from a second user terminal, second avatar information corresponding to a second user. Here, the first avatar information and the second avatar information may include at least one of an avatar image corresponding to user or index information about each item included in the avatar image.

In operation S620, the electronic apparatus (or its processor) identifies at least one first information of the first avatar information and at least one second information of the second avatar information. Here, the first information and the second information may relate to image information or index information about items included in the first avatar information and the second avatar information.

In operation S630, the electronic apparatus (or its processor) identifies a first item among the plurality of items based on the identified first information of the first avatar information. In operation, S640, the electronic apparatus (or its processor) identifies a second item among the plurality of items based on the identified second information of the second avatar information.

In operation 650, the electronic apparatus (or its processor) obtains a virtual space image in a metaverse by inputting the feature information corresponding to the identified first item and to the identified second item to the trained neural network model. Here, the feature information corresponding to the first item and the identified second item may include at least one of an image corresponding to each item or index information corresponding to each item. Here, the operation S650 may include obtaining the virtual space image by inputting an item of a specific type from the identified first item and an item of a specific type from the identified second item to the trained neural network model.

In operation S660, the electronic apparatus (or its processor) transmits the virtual space image to the first user terminal and the second user terminal.

The operation S660 may further include, when a negative feedback regarding the virtual space image is received after the obtained virtual space image is transmitted to the first user terminal and the second user terminal, re-obtaining a virtual space image by re-inputting feature information corresponding to the first item and feature information corresponding to the second item to the trained neural network model and transmitting the re-obtained virtual space image to the first user terminal and the second user terminal.

In addition, the operation S660 may further include, when a negative feedback regarding the virtual space image is received after the re-obtained virtual space image is transmitted to the first user terminal and the second user terminal, transmitting another one of the plurality of virtual space image or one of a plurality of virtual space sample images to the first user terminal and the second user terminal.

Here, the operation S660 may include selecting one of the plurality of virtual space sample images based on the feature information corresponding to the first item and the feature information corresponding to the second item and transmitting the same to the first user terminal and the second user terminal.

Figure 7:
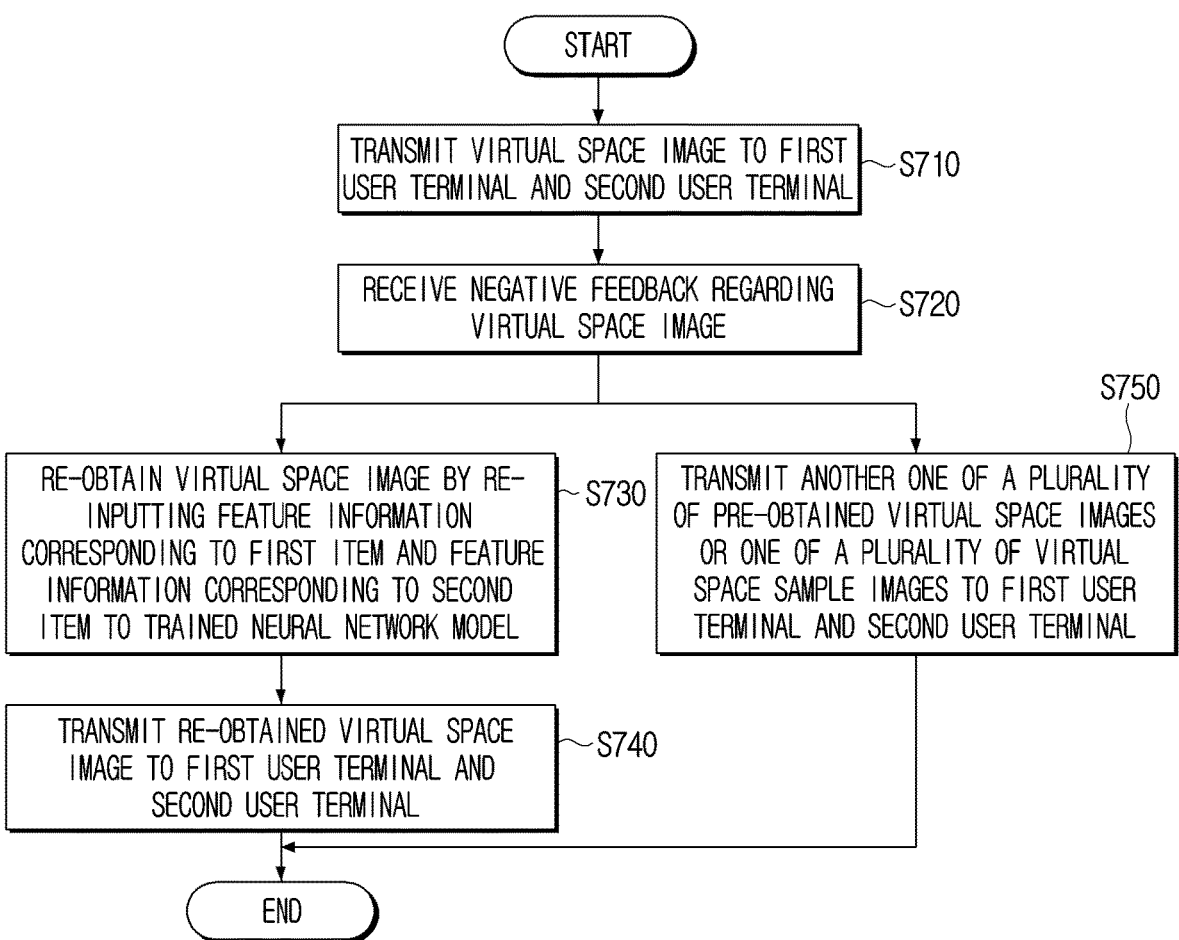
FIG. 7 is a flowchart provided to explain a method of obtaining another virtual space image according to an embodiment.

FIG. 7 is a flowchart provided to explain a method of obtaining another virtual space image according to an embodiment. In FIG. 7, at first, a virtual space image is transmitted to the first user terminal and the second user terminal (S710). Subsequently, a negative feedback regarding the virtual space image is received (S720).

When the negative feedback regarding the virtual space image is received, a virtual space image is re-obtained by re-inputting feature information corresponding to the first item and feature information corresponding to the second item to the trained neural network model (S730).

According to an embodiment, when a negative feedback regarding the virtual space image corresponding to the first item is received from a user terminal through the communication interface 110, the processor may re-obtain a virtual space image by re-inputting the pre-input feature information corresponding to the first item and feature information corresponding to the second item to the trained neural network model. In this case, the re-obtained virtual space image may be an image different from the virtual space image transmitted to the user terminal.

According to an embodiment, feature information corresponding to a plurality of items is re-input to the trained neural network model. In this case, the processor 130 may obtain a plurality of virtual space images from the trained neural network model and a probability value corresponding to an accuracy of each image, and re-obtain, among the plurality of virtual space images, an image having the relatively highest probability value from among the virtual space images other than the virtual space image pre-transmitted to the user terminal.

Subsequently, the re-obtained virtual space image is transmitted to the first user terminal and the second user terminal (S740). In the above-described example, the processor 130 may transmit the image having the relatively highest probability value from among the plurality of virtual space images to the first user terminal and the second user terminal.

In S720, when a negative feedback regarding the virtual space image is received, another one of the pre-obtained plurality of virtual space images or one of a plurality of virtual space sample images is transmitted to the first user terminal and the second user terminal (S750).

Here, the pre-obtained plurality of virtual space images means the virtual space images pre-obtained from the trained neural network model. The pre-obtained virtual space images are different from the currently-obtained virtual space image, and mean the virtual space images obtained from a neural network model previously.

According to an embodiment, the processor 130 may store a virtual space image obtained from the trained neural network model in the memory 120. According to an embodiment, the virtual space image may be stored in the memory 120 at least one of at the time of creation, at the time when it is output from the neural network model, at the time when the operation of a related application in the user terminal is terminated, or at a predetermined period. For example, the information on the storage time point may be pre-stored, or the storage time may be a time point selected by a user command.

According to an embodiment, the processor 130 may transmit User Interface (UI) information for guiding selection of a storage time point of a virtual space image to a user terminal through the communication interface 110, and the processor 130 may identify a storage time point of a virtual space image based on a received user's input. For example, the guide UI may include information for guiding selection of at least one of a creation time of a virtual space image, an end time of driving a related application in a user terminal or a predetermined period.

According to an embodiment, when a negative feedback regarding the virtual space image is received, the processor 130 may identify one of a plurality of virtual space images stored in the memory 120 and transmit the same to the user terminal. For example, the processor 130 may randomly identify one of a plurality of virtual space images and transmit the same to the user terminal.

The virtual space sample image means a sample image regarding a virtual space corresponding to each category. The virtual space may be of a plurality of different categories such as a fitness club, a party room, a soccer field, a game field, etc. The processor 130 may obtain a virtual space sample image corresponding to each category and store the same in the memory 120. Alternatively, a virtual space sample image may be pre-stored in the memory 120 upon initial setting.

According to an embodiment, when a negative feedback regarding a virtual space image is received, the processor 130 may transmit one of a plurality of virtual space sample images stored in the memory 120 to a user terminal based on feature information of an item. For example, when the identified item is a hair band, a training suit and sneakers, the processor 130 may identify a virtual space sample image corresponding to a fitness club from among the plurality of virtual space sample images and transmit the same to the user terminal. In this case, a virtual space sample image corresponding to the identified item may be mapped and pre-stored in the memory 120.

For example, a virtual space sample image corresponding to a fitness club may be mapped and pre-stored in the memory 120 as a sample image corresponding to each of the hair band, the training suit, and the sneakers. Accordingly, the processor 130 may identify a virtual space sample image based on the identified item.

Figure 8:
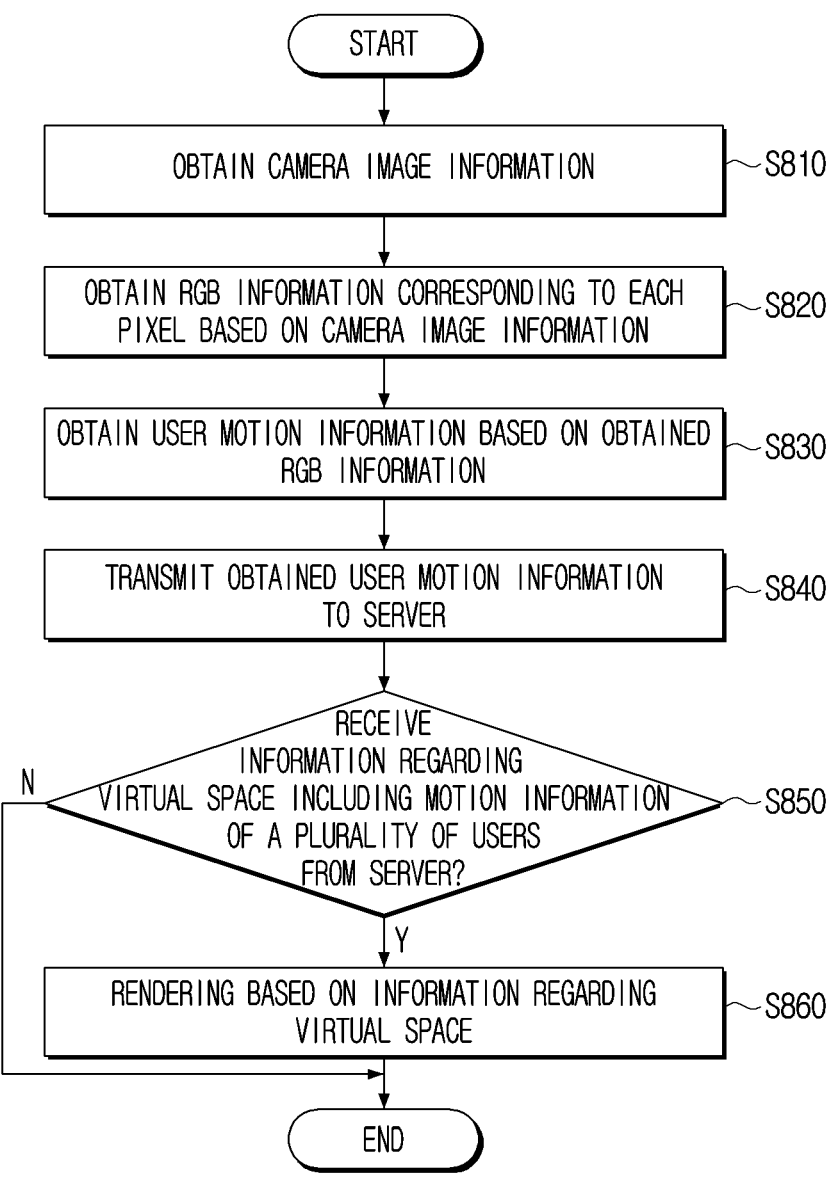
FIG. 8 is a view provided to explain a method of obtaining avatar information of a user terminal according to an embodiment.

FIG. 8 illustrates an operation procedure of obtaining avatar information of a user terminal according to an embodiment. In FIG. 8, firstly, camera image information is obtained (S810). The user terminal 10 may include a camera, and the user terminal 10 may obtain camera image information through the camera. In this case, the camera image information may be camera image information capturing a user in real time. Subsequently, Red/Green/Blue (RGB) information corresponding to each pixel may be obtained based on the camera image information (S820).

Subsequently, user motion information is obtained based on the obtained RGB information (S830). Specifically, the user terminal 10 may obtain a user's motion information based on the amount of change in the obtained RGB information corresponding to each pixel. For example, the user terminal 10 may identify the user's joint and pose based on the RGB information corresponding to each pixel, and obtain the user's motion information based on a change in the identified joint and pose. Here, the processor of the user terminal may obtain motion information of an avatar corresponding to the obtained motion information of the user. In other words, the user motion information may be re-targeted to the avatar.

Subsequently, the obtained user's motion information is transmitted to a server (S840). Subsequently, it is identified whether information regarding the virtual space including motion information of a plurality of users is received from the server (S850). Here, the information regarding the virtual space may include another user's avatar information generated based on another user's motion information received from another user terminal, and may also include virtual space information on the metaverse space.

Subsequently, rendering is performed based on the information regarding the virtual space (S860). When avatar information corresponding to another user and virtual space information is received, the user terminal 10 may render and display the same through a display provided in the user terminal.

Figure 9:
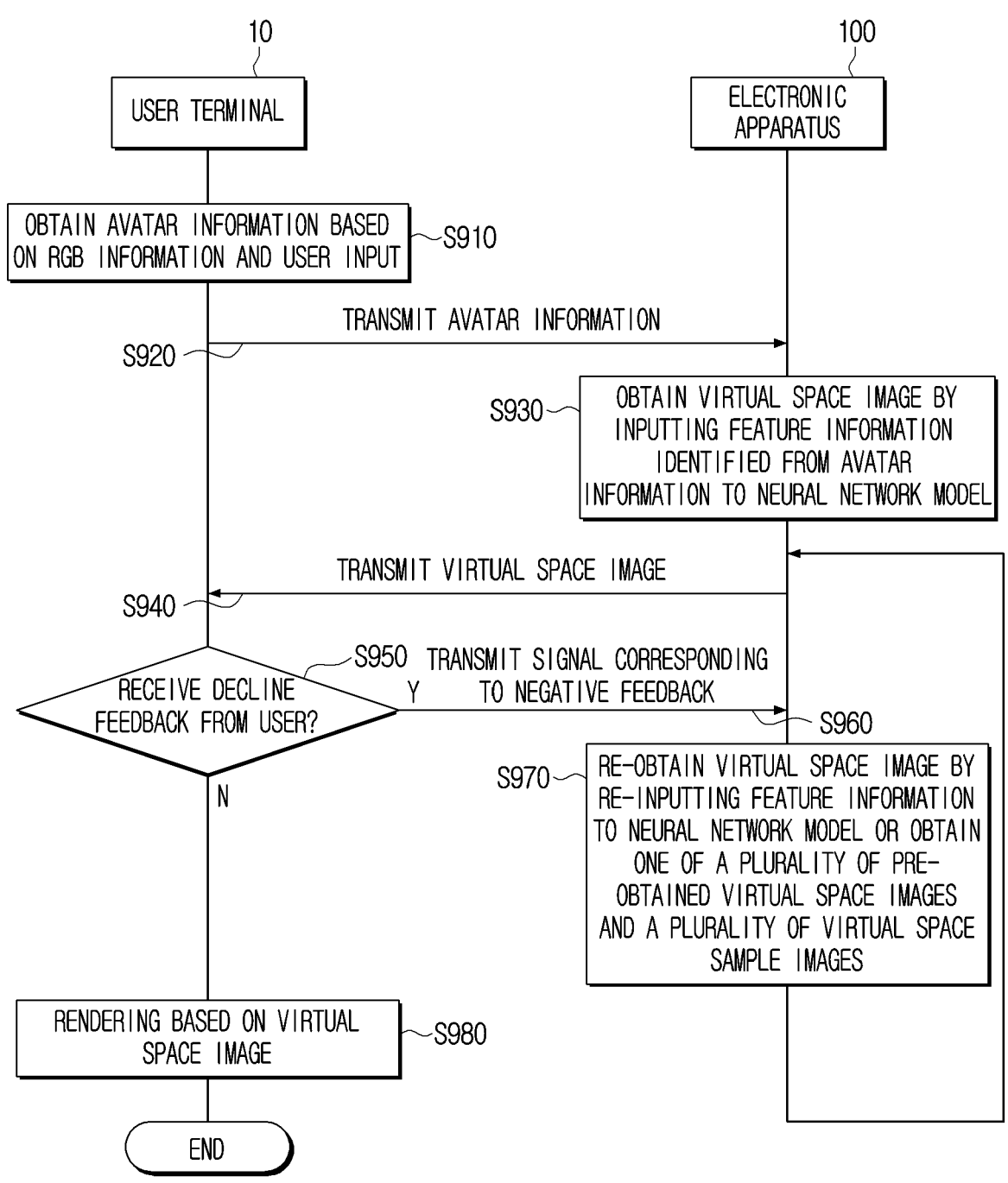
FIG. 9 is a flowchart provided to explain a method of obtaining virtual space information according to an embodiment.

FIG. 9 illustrates an operation procedure of obtaining virtual space information according to an embodiment. As a first operation, the user terminal 10 obtains avatar information based on RGB information and a user's input (S910). This has been described in detail with reference to FIG. 8, and thus, a detailed acquisition method will be omitted.

Subsequently, the user terminal 10 transmits the obtained avatar information to the electronic apparatus 100 (S920). Subsequently, the electronic apparatus 100 obtains a virtual space image by inputting feature information identified from the avatar information to a neural network model (S930).

Subsequently, the electronic apparatus 100 transmits the obtained virtual space image to the user terminal (S940). In this case, the electronic apparatus 100 may transmit the obtained virtual space image to the user terminal through the communication interface 110.

Subsequently, the user terminal 10 identifies whether a negative feedback is received from the user (S950). In this case, the user terminal 10 may receive a user's input corresponding to a negative feedback through a user interface provided in the user terminal 10.

Subsequently, when a negative feedback is received from the user ("Y" in S950), the user terminal 10 transmits a signal corresponding to the negative feedback to the electronic apparatus 100 (S960).

Subsequently, the electronic apparatus 100 re-obtains a virtual space image by re-inputting feature information to the neural network model, or obtains the pre-obtained plurality of virtual space images and one of a plurality of virtual space sample images (S970). Subsequently, the electronic apparatus 100 re-obtains a virtual space image by re-inputting feature information to a neural network model, or obtains one of the pre-obtained plurality of virtual space images or a plurality of virtual space sample images (S970).

Subsequently, the electronic apparatus 100 transmits the re-obtained virtual space image or one of the pre-obtained plurality of virtual space images or the plurality of virtual space sample images to the user terminal 10. This has been described in detail with reference to FIG. 7, and thus, a specific acquisition method will be omitted. When a negative feedback is not received from the user ("N" in S950), the user terminal 10 performs rendering based on the obtained virtual space image (S980).

Figure 10:
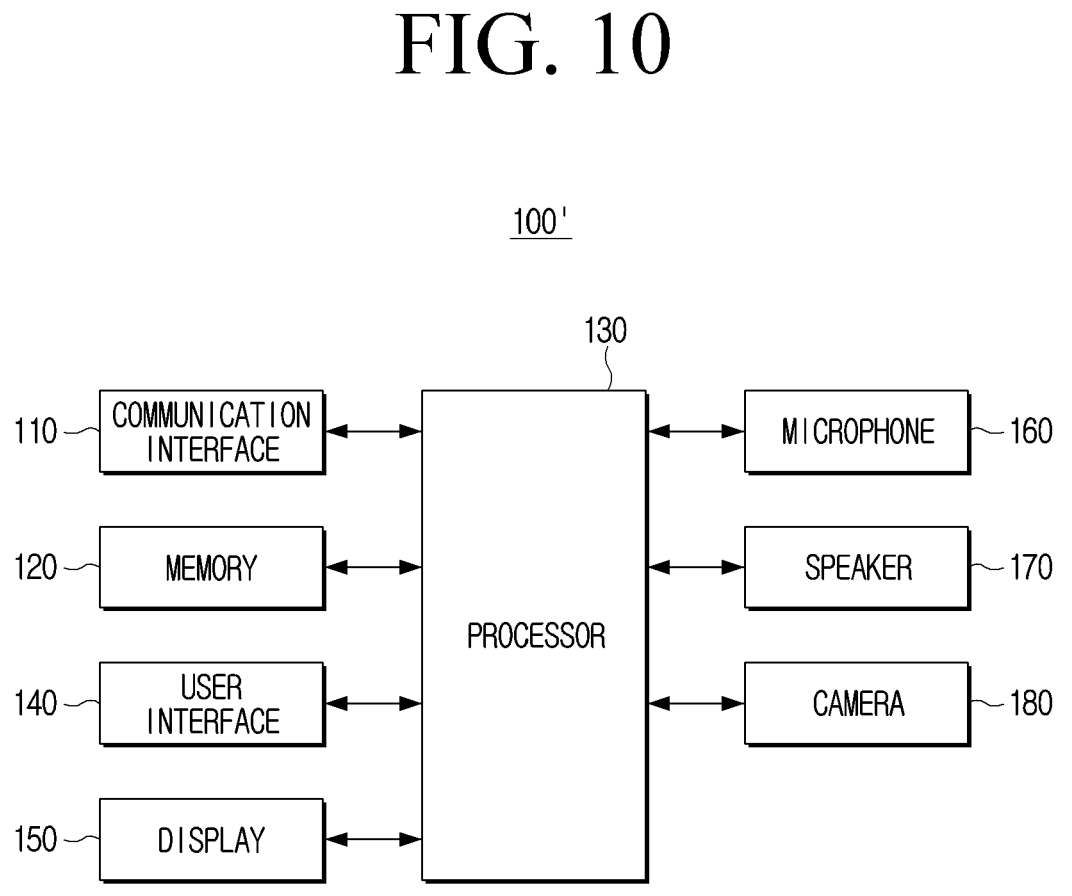

FIG. 10 is a view provided to explain detailed configuration of an electronic apparatus according to an embodiment. In FIG. 10, an electronic apparatus 100' may include the communication interface 110, the memory 120, the processor 130, a user interface 140, a display 150, a microphone 160, a speaker 170, and a camera 180. Among the components shown in FIG. 10, detailed descriptions of components overlapping with those shown in FIG. 2 will be omitted.

The user interface 140 is a component for the electronic apparatus 100' to perform an interaction with a user. For example, the user interface 140 may include at least one of a touch sensor, a motion sensor, a button, a jog dial, a switch, a microphone, or a speaker, but is not limited thereto.

The display 150 may be implemented as a display including a self-illuminating element or a display including a non-illuminating element and a backlight. For example, the display 150 may be implemented as various types of displays such as a liquid crystal display (LCD), an organic light emitting diode (OLED) display, light emitting diodes (LED), a micro LED, a mini LED, a Plasma Display Panel (PDP), a Quantum-Dot (QD) display, Quantum-Dot light-emitting diodes (QLED), etc. The display 150 may include a driving circuit, a backlight unit, and the like, which may be implemented in the form such as an Thin Film Transistor (TFT), Low Temperature Poly Silicon (LTPS) TFT, or an Organic TFT (OTFT). The display 150 may be implemented as a touch screen combined with a touch sensor, a flexible display, a rollable display, a Three-Dimensional (3D) display, a display in which a plurality of display modules are physically connected, etc. In addition, the display 150 may have a built-in touch screen, and may be configured to execute a program using a finger or a pen (e.g., a stylus pen).

The microphone 160 may refer to a module that obtains sound and converts it into an electrical signal, and may be a condenser microphone, a ribbon microphone, a moving coil microphone, a piezoelectric element microphone, a carbon microphone, or a Micro Electro Mechanical System (MEMS) microphone. In addition, the microphone 160 may be implemented in a non-directional, bi-directional, unidirectional, sub-cardioid, super-cardioid, or hyper-cardioid method.

The speaker 170 may consist of a tweeter for reproducing high-pitched sound, a mid-range for reproducing mid-range sound, a woofer for reproducing low-pitched sound, a subwoofer for reproducing sound in extremely low-pitched range, an enclosure for controlling resonance, a crossover network for dividing an electric signal frequency input to the speaker by band, etc.

The speaker 170 may output a sound signal to the outside of the electronic apparatus 100'. The speaker 170 may output multimedia reproduction, recording reproduction, various notification sounds, voice messages, etc. The electronic apparatus 100' may include an audio output device such as the speaker 170, but may include an output device such as an audio output terminal. In particular, the speaker 170 may provide obtained information, information processed/produced based on the obtained information, a response result or an operation result regarding a user voice, etc. in the form of a voice.

The camera 180 may obtain an image by capturing an area within a certain Field of View (FoV). The camera 180 may include a lens that focuses visible light and other optical signals received after being reflected by an object into an image sensor and an image sensor capable of detecting visible light and other optical signals. Here, the image sensor may include a 2D pixel array that is divided into a plurality of pixels.

According to the above example, a virtual space image may be automatically created based on an item of a user's avatar, and a virtual world may be rendered including the automatically created virtual space image. Accordingly, users do not have to select one of the previously created virtual space themes separately, and developers such as engineers do not have to directly create virtual spaces one by one even if the users want a virtual space other than the previously created virtual spaces.

The methods according to the diverse embodiments of the disclosure described above may be implemented in the form of an application that may be installed in an existing display apparatus. Alternatively, the methods according to the diverse embodiments of the disclosure described above may be performed using a deep learning-based artificial neural network (or a deep artificial neural network), that is, a learning network model. In addition, the methods according to the diverse embodiments of the disclosure described above may be implemented only by software upgrade or hardware upgrade for the existing display apparatus. Further, the diverse embodiments of the disclosure described above may also be performed through an embedded server of the electronic apparatus or an external server of the electronic apparatus.

According to an embodiment, the above-described one or more embodiments of the disclosure may be implemented as software including instructions that can be stored in machine-readable storage media, which can be read by machine (e.g., computers). The machine refers to an apparatus that calls instructions stored in a storage medium, and can operate according to the called instructions, and the apparatus may include an electronic apparatus (e.g., an electronic apparatus 100, 100') according to the embodiments described in the disclosure. When an instruction is executed by a processor, the processor may perform a function corresponding to the instruction by itself, or by using other components under its control. The instruction may include a code that is generated or executed by a compiler or an interpreter. The storage medium that is readable by machine may be provided in the form of a non-transitory storage medium. Here, the term 'non-transitory' only means that a storage medium does not include signals, and is tangible, but does not indicate whether data is stored in the storage medium semi-permanently or temporarily.

In addition, according to an embodiment of the disclosure, the method according to the one or more embodiments described above may be provided while being included in a computer program product. A computer program product refers to a product, and it can be traded between a seller and a buyer. The computer program product can be distributed on-line in the form of a storage medium that is readable by machines (e.g.: a Compact Disc Read Only Memory (CD-ROM)), or through an application store (e.g.: Playstore™). In the case of on-line distribution, at least a portion of the computer program product may be stored in a storage medium such as the server of the manufacturer, the server of the application store, and the memory of the relay server at least temporarily, or may be generated temporarily.

In addition, each of components (for example, modules or programs) according to the diverse embodiments described above may include a single entity or a plurality of entities, and some of the corresponding sub-components described above may be omitted or other sub-components may be further included in the diverse embodiments. Alternatively or additionally, some of the components (for example, the modules or the programs) may be integrated into one entity, and may perform functions performed by the respective corresponding components before being integrated in the same or similar manner. Operations performed by the modules, the programs, or other components according to the diverse embodiments may be executed in a sequential manner, a parallel manner, an iterative manner, or a heuristic manner, at least some of the operations may be performed in a different order or be omitted, or other operations may be added.

While preferred embodiments of the disclosure have been shown and described, the disclosure is not limited to the aforementioned specific embodiments, and it is apparent that various modifications can be made by those having ordinary skill in the art to which the disclosure belongs, without departing from the gist of the disclosure as claimed by the appended claims, and such modifications are not to be interpreted independently from the technical idea or prospect of the disclosure.

What is claimed is:

1. An electronic apparatus comprising:
a communication interface;
a memory configured to store feature information corresponding to a plurality of items corresponding to an avatar and a trained neural network model; and
a processor associated with the communication interface, the memory, the processor configured to:
receive, from a first user terminal, first avatar information corresponding to a first user and receive, from a second user terminal, second avatar information corresponding to a second user;
identify at least one first information of the first avatar information and at least one second information of the second avatar information;
identify a first item among the plurality of items based on the identified first information of the first avatar information;
identify a second item among the plurality of items based on the identified second information of the second avatar information;
obtain a first common virtual space image in a metaverse by inputting the feature information corresponding to the identified first item and to the identified second item to the trained neural network model; and
transmit the obtained first common virtual space image to the first user terminal and the second user terminal through the communication interface,
wherein the processor is further configured to:
based on a negative feedback regarding the transmitted first common virtual space image being received from the first user terminal or the second user terminal, re-obtain a second common virtual space image by re-inputting feature information corresponding to the first item and the second item to the trained neural network model; and
transmit the re-obtained second common virtual space image to the first user terminal and the second user terminal through the communication interface, and
wherein the first common virtual space image and the second common virtual space image exclude the avatar, and
wherein the trained neural network model is trained to, based on the plurality of items, create and output a virtual space image related to the plurality of items.

2. The electronic apparatus of claim 1, wherein the trained neural network model is trained to, based on the plurality of items being input, create and output a virtual space image related to an item of a specific type from among the plurality of items.

3. The electronic apparatus of claim 1, wherein the first avatar information and the second avatar information comprise at least one of avatar image corresponding to a user or index information about an item of the plurality of items, and wherein the feature information corresponding to the identified first feature item and the identified second item comprise at least one of an image corresponding to an item of the plurality of items or index information about an item of the plurality of items.

4. The electronic apparatus of claim 1, wherein the memory is further configured to store at least one of a plurality of virtual space images obtained from the trained neural network model or a plurality of virtual space sample images that belong to different categories, and wherein the processor is further configured to, based on the negative feedback regarding the transmitted first common virtual space image being received from the first user terminal or the second user terminal, transmit, to the first user terminal and the second user terminal through the communication interface, another one of the plurality of virtual space images or one of the plurality of virtual space sample images.

5. The electronic apparatus of claim 4, wherein the processor is further configured to select one of the plurality of virtual space sample images based on feature information corresponding to the first item and the second item and transmit the selected image to the first user terminal and the second user terminal through the communication interface.

6. The electronic apparatus of claim 1, wherein the processor is further configured to obtain the first common virtual space image by inputting a specific type of item from the identified first item and a specific type of item from the identified second item to the trained neural network model.

7. The electronic apparatus of claim 6, wherein the plurality of items corresponding to an avatar comprises different types of items, and wherein the different types of items comprise at least one of a clothing item, an accessory item, a skin item, a hair item, or a face item.

8. A method of an electronic apparatus, the method comprising:

receiving, from a first user terminal, first avatar information corresponding to a first user and receive, from a second user terminal, second avatar information corresponding to a second user;

identifying at least one first information of the first avatar information and at least one second information included in the second avatar information;

identifying a first item among the plurality of items based on the identified first information of the first avatar information;

identifying a second item among the plurality of items based on the identified second information of the second avatar information;

obtaining a first common virtual space image in a metaverse by inputting the feature information corresponding to the identified first item and the identified second item to a trained neural network model;

transmitting the obtained first common virtual space image to the first user terminal and the second user terminal;

based on a negative feedback regarding the transmitted first common virtual space image being received from the first user terminal or the second user terminal, re-obtaining a second common virtual space image by re-inputting feature information corresponding to the first item and the second item to the trained neural network model; and transmitting the re-obtained second common virtual space image to the first user terminal and the second user terminal through the communication interface, and wherein the first common virtual space image and the second common virtual space image exclude the avatar, and wherein the method further comprises training the trained neural network, based on the plurality of items, for creating and outputting a virtual space image related to the plurality of items.

9. The method of claim 8, further comprising training the trained neural network model based on the plurality of items for creating and outputting a virtual space image related to an item of a specific type from the plurality of items.

10. The method of claim 8, wherein the first avatar information and the second avatar information comprise at least one of avatar image corresponding to a user or first index information about an item of the plurality of items and wherein the feature information corresponding to the first item and the identified second item comprise at least one of an image corresponding to the item or second index information corresponding to the item.

11. The method of claim 8, further comprising:

based on the negative feedback regarding the first common virtual space image being received from the first user terminal or the second user terminal, transmitting another one of the plurality of virtual space images or one of the plurality of virtual space sample images to the first user terminal and the second user terminal.

12. The method of claim 11, wherein the transmitting the obtained first common virtual space image comprises selecting one of the plurality of virtual space sample images based on feature information corresponding to the first item and the second item and transmitting the selected image to the first user terminal and the second user terminal.

13. A non-transitory computer readable recording medium in which a computer instruction is executed by a processor of an electronic apparatus so that the electronic apparatus performs an operation, the operation comprising:

receiving, from a first user terminal, first avatar information corresponding to a first user and receive, from a second user terminal, second avatar information corresponding to a second user;

identifying at least one first information of the first avatar information and at least one second information of the second avatar information;

identifying a first item among the plurality of items based on the identified first information of the first avatar information, identifying a second item among the plurality of items based on the identified second information of the second avatar information;

obtaining a first common virtual space image in a metaverse by inputting the feature information corresponding to the identified first item and to the identified second item to the trained neural network model;

transmitting the obtained first common virtual space image to the first user terminal and the second user terminal through the communication interface;

based on a negative feedback regarding the transmitted first common virtual space image being received from the first user terminal or the second user terminal, re-obtaining a second common virtual space image by re-inputting feature information corresponding to the first item and the second item to the trained neural network model; and transmitting the re-obtained second common virtual space image to the first user terminal and the second user terminal through the communication interface, wherein the first common virtual space image and the second common virtual space image exclude the avatar, and wherein the operation further comprises training the trained neural network, based on the plurality of items, for creating and outputting a virtual space image related to the plurality of items.

*  *  *  *  *